UNITED STATES PATENT OFFICE.

FERDINAND GERHARD WIECHMANN, OF NEW YORK, N. Y., ASSIGNOR TO FENOFORM CORPORATION, OF HASTINGS UPON HUDSON, NEW YORK, A CORPORATION OF NEW YORK.

PLASTIC COMPOUND AND METHOD OF MAKING SAID COMPOUND.

1,067,856.  Specification of Letters Patent.  Patented July 22, 1913.

No Drawing.  Application filed February 1, 1910.  Serial No. 541,336.

*To all whom it may concern:*

Be it known that I, FERDINAND GERHARD WIECHMANN, a citizen of the United States, residing at New York city, county and State of New York, have invented a New Plastic Compound and Method of Making Said Compound, of which the following is a specification.

Broadly stated, my invention consists in combining caoutchouc or any gum, as for instance balata, chicle, rubber or rubber substitutes of whatever nature, with vegetable albumen, and if desired with a consolidating agent, a loading material or a coloring material.

To carry my invention into effect I proceed in the following manner:

Example 1: I take caoutchouc or any of the gums, rubber or rubber substitutes above specified, and place them in the rubber mill, and then manipulate them and sheet them in the usual manner. When this stage is reached I introduce vegetable albumen in whatever form I choose to employ it, for instance in a finely pulverized condition, and then intimately mix the two together, in the usual manner. The mill may be either cold or heated, and the products heated until the desired degree of intimate admixture is reached. I can carry on this process with varied amounts of the substances employed, thus for instance, I may employ 25% of the caoutchouc or rubber and 75% of the vegetable albumen, depending upon the final product which I wish to obtain, whether soft, semi-solid or solid.

Example 2: I start with the caoutchouc or gum, rubber or rubber substitute, whichever I choose to employ, and submit it to the same manipulation in the rubber mill, as described in Example 1, and then incorporate with it on the mill, the vegetable albumen in solution. As a sample of a solution which I may employ, I take 50 parts of vegetable albumen to which I add 50 parts of a condensation product of phenol and formaldehyde, and continue the manipulation on the mill (hot or cold) until the bodies are intimately mixed.

Example 3: I treat the caoutchouc or gum, rubber or rubber substitute in the manner described in Example 1, and to this I add a dry pulverized mixture of vegetable albumen, and a dry condensation product of phenol and formaldehyde, and continue the manipulation until the parts are intimately mixed, after which, as the material leaves the mill, it may be subjected to the action of temperature and pressure to bring about final consolidation of the product.

Example 4: I treat the caoutchouc or gum, rubber or rubber substitute in the manner described in Example 1, and then add on the mill, a body composed of a siccative oil such as oxidized linseed oil and vegetable albumen. I may also add any body which will coact with the rubber to produce a hard substance when subjected to vulcanization.

Example 5: I treat the caoutchouc or gum, rubber or rubber substitute in the manner described in Example 1, and then add on the mill, vegetable albumen, a loading material such as whiting, cellulose, wood pulp, or any material such as is used in loading rubber may be employed, and if desired a coloring material. I may also use a consolidating material such as a condensation product of phenol and formaldehyde, or a substance such as sulfur, which will promote vulcanization.

In my application Ser. No. 527,754 filed Nov. 13, 1909 is described and claimed the compounding of the particular vegetable albumen known in the art as vegetable ivory or corozo with rubber and with products of reaction of phenol and formaldehyde, and the products resulting therefrom. The claims of the present application are drawn to the compounding of vegetable albumen in a somewhat similar manner, and are generic to the claims of such application. Such albuminous vegetable substances or vegetable albumens in a finely ground condition form a most intimate combination with rubber both alone and when products of reaction of phenol and formaldehyde are also added and to some extent seem to simulate and replace sulfur in the rubber compounds.

In carrying out the process described in the five examples, I prefer, as stated, to sheet the rubber on an ordinary mill. I do not limit myself however to this treatment, as I may reduce the rubber to a plastic condition by the addition of any rubber solvent, such as for instance, carbon bi-sulfid. I further prefer to divide the vegetable albumen to a fine powder which may be done by grinding or otherwise. I further prefer to employ a condensation product of phenol and formaldehyde, in the form described by Dr. Baekeland in the March number of the *Journal of Industrial and Engineering Chemistry* (page 154, volume 1) as "A", which may be either a dry powder or a liquid. I do not limit myself in any wise to the order of the introduction or incorporation of the vegetable albumen, the condensation product of phenol and formaldehyde, the addition of the vulcanizing agent (sulfur), or the loading materials, as the order of use or incorporation will depend upon the character of the body to be produced. I may also incorporate coloring materials of various kinds as well as other materials for special uses, as for instance, abrasive materials, materials such as finely divided particles of metals intended to present frictional surfaces, as for instance in the formation of non-skidding tires and the like.

Generally, I wish it understood that I claim the employment, with caoutchouc or a gum of the character specified, of vegetable albumen, together with any and every material which may be employed to bring these materials into a condition suitable for uses in the arts, whether in the form of a soft, semi-soft or a hard body.

Having thus described my invention, I claim:

1. A new plastic composition comprising rubber and vegetable albumen, in a substantially homogeneous form, and containing an amount of vegetable albumen greater than the amount of rubber present.

2. In combination with a gum of the character indicated, a vegetable albumen and a condensation product of phenol and formaldehyde.

3. In combination with a gum of the character indicated, a vegetable albumen, a condensation product of phenol and formaldehyde, and a vulcanizing agent.

4. The process of producing a substance of the character specified, which consists in first reducing a gum of the character indicated to the form of a sheet, and then incorporating therewith a vegetable albumen.

5. The process described which consists in reducing a gum of the character indicated to a plastic condition and then introducing a vegetable albumen and a consolidating agent.

6. The process described which consists in reducing a gum of the character indicated to the form of a sheet, distributing thereon and rolling therein pulverized vegetable albumen, then sprinkling thereon and rolling therein a condensation product of phenol and formaldehyde.

7. The process described which consists in mixing a gum of the character indicated with vegetable albumen, then adding a product of reaction of phenol and formaldehyde, and finally subjecting the mass to the required temperature to effect consolidation of the same.

8. A new plastic composition comprising rubber, vegetable albumen and other compounding materials in a substantially homogeneous and consolidated form, the amount of vegetable albumen being greater than the amount of caoutchouc present.

In testimony whereof, I affix my signature, in the presence of two witnesses.

FERDINAND GERHARD WIECHMANN.

Witnesses:
 HELEN E. KOELSCH,
 W. A. TOWNER, Jr.